(12) United States Patent
Pelton

(10) Patent No.: US 7,256,235 B2
(45) Date of Patent: Aug. 14, 2007

(54) ADHESIVE COMPOSITION FOR ADHERING TEXTILES TO EPDM RUBBER

(75) Inventor: Daniel A. Pelton, Battlefield, MO (US)

(73) Assignee: Dayco Products, LLC, Miamisburg, OH (US)

( * ) Notice: Subject to any disclaimer, the term of this patent is extended or adjusted under 35 U.S.C. 154(b) by 56 days.

(21) Appl. No.: 11/033,353

(22) Filed: Jan. 11, 2005

(65) Prior Publication Data

US 2005/0147817 A1    Jul. 7, 2005

Related U.S. Application Data

(60) Division of application No. 10/093,281, filed on Mar. 7, 2002, now Pat. No. 6,860,962, which is a continuation-in-part of application No. 09/526,895, filed on Mar. 16, 2000, now abandoned.

(51) Int. Cl.
C08F 214/08    (2006.01)
(52) U.S. Cl. .................. 524/519; 524/521; 524/526
(58) Field of Classification Search ............. 524/519, 524/521, 526
See application file for complete search history.

(56) References Cited

U.S. PATENT DOCUMENTS

| | | | |
|---|---|---|---|
| 3,060,078 A | 10/1962 | Atwell | |
| 3,325,333 A | 6/1967 | Kigane | |
| 3,993,612 A * | 11/1976 | Aihara et al. | 524/559 |
| 5,176,781 A | 1/1993 | Mori et al. | |
| 5,300,569 A * | 4/1994 | Drake et al. | 525/78 |
| 5,654,099 A | 8/1997 | Pelton | |
| 5,683,819 A | 11/1997 | Mori et al. | |
| 5,807,634 A | 9/1998 | Pelton | |
| 6,048,587 A * | 4/2000 | Estrin | 427/496 |

FOREIGN PATENT DOCUMENTS

| | | |
|---|---|---|
| GB | 2042563 | 9/1980 |
| JP | 4-81476 | 3/1992 |

OTHER PUBLICATIONS

Estrin & Nalepa, "Maleinized Polybutadiene Latex for Fiber to Rubber Adhesion", Paper N. 51, Presented: 155th Rubber Div., Amer. Chemical Soc., Chicago, IL, Apr. 13-16, 1999.

* cited by examiner

Primary Examiner—Peter D. Mulcahy
(74) Attorney, Agent, or Firm—Joseph V. Tassone; J. Daniel Lykins

(57) ABSTRACT

An improved adhesive composition and method for adhering textile reinforcing elements to rubber, particularly ethylene-propylene-diene rubber in the manufacture of rubber articles such as power transmission belts, wherein the adhesive composition comprises a latex of a hydrogenated styrene-butadiene rubber, a carboxylated hydrogenated styrene-butadiene rubber, a hydrogenated nitrile-butadiene rubber, a carboxylated hydrogenated nitrile-butadiene rubber, a chlorosulfonated polyethylene or blends thereof; an aqueous solution of a half-ester of maleinized liquid poly butadiene; and, optionally, up to about 15% by weight carbon black in an aqueous solution.

20 Claims, No Drawings

ADHESIVE COMPOSITION FOR ADHERING TEXTILES TO EPDM RUBBER

RELATED APPLICATIONS

This application is a Division of U.S. application Ser. No. 10/093,281, filed Mar. 7, 2002, now U.S. Pat. No. 6,860,962, which is a continuation-in-part of U.S. application Ser. No. 09/526,895, filed Mar. 16, 2000, now abandoned.

BACKGROUND OF THE INVENTION

The present invention relates to the bonding of textile reinforcements to high temperature resistant rubber and, more particularly, this invention relates to an improved adhesive composition for adhering such textile reinforcements to EPDM (ethylene-propylene-diene rubber) for use in reinforced rubber-based products such as high temperature resistant power transmission belts.

With the increased demand for higher temperature power transmission belts, there is a need for an improved adhesive to bond textile reinforcements to rubber compositions used in the manufacture of high temperature resistant articles. Typically, a reinforcing material for use in power transmission belts and other reinforced high temperature resistant rubber products is dipped in a resorcinol-formaldehyde-latex (RFL) suspension to enhance the bonding of the rubber to the material. Typically, the RFL dip is prepared by mixing the RFL prepolymer with a latex. RFL technology is very old chemistry and has been used for many years to attain adhesion to rubber compounds. Most rubber formulations are compounded with phenolic resins containing a formaldehyde donor to continue the crosslinking reaction between the RF in the compound to the RF on the treated textile. The resorcinol-formaldehyde resin provides adhesion to the reinforcing material while the latex provides adhesion to the rubber. Where the surface reactivity of the reinforcing material is low, as in polyester and aramid cords, the cord is usually pre-treated with a composition which improves its reactivity. Compositions that have been used for this purpose include epoxy resins and isocyanates. Conventionally, belts are prepared by bonding a double-twisted cord to the rubber. The cord is immersed in a RFL dip and transported through a vertical oven where it is heated under tension for a predetermined period of time. This causes the cord to elongate and restructure the polyester. This process is known as "stress elongation" or "heat set". The process dries the adhesive which is coated on the cord. The common RFL dip systems have also been developed for general purpose rubber compounds such as natural rubber and styrene-butadiene rubber. For these rubbers, the latex used in the RFL dip is often a terpolymer based on styrene, butadiene and vinyl pyridine. For less reactive rubber compounds, such as EPDM, the common RFL dip systems are not suitable.

Prior art methods of adhering polyester cord, e.g., to rubbers such as chlorosulfonated polyethylene (CSM) have included the use of neoprene latex and vinyl pyridine latex in the RFL latex dip.

U.S. Pat. No. 3,325,333 to Kigane et al. teaches a method of adhering a polyester cord to a CSM rubber compound by treating the cord with an aqueous adhesive composition containing methylolated blocked organic polyisocyanate and a vulcanizable organic polymer at conventional polyester treating temperatures.

U.S. Pat. No. 3,060,078 to Atwell teaches a method of bonding polyester cord fibers to a CSM rubber compound by treating the cord with a resorcinol-formaldehyde-neoprene latex adhesive composition prior to heat setting the treated cord with the CSM rubber compound.

Japanese (Kokai) Pat. Appln. No. H4-81476 to Toyoda Gosei Co. Ltd. teaches a very specific adhesive obtained by mixing (i) a butadiene rubber latex with (ii) a styrene-butadiene-vinyl pyridine terpolymer latex and (iii) a chlorosulfonated polyethylene latex in weight ratios of the components i/ii=80/20 to 70/30 and the components (i+ii)/iii=95/5 to 75/25 to obtain a rubber latex which is then mixed with a resorcin-formaldehyde resin to provide an adhesive suitable for bonding ethylene-propylene-based rubber to synthetic fibers.

UK Pat. Appln. No. GB 2,042,563 to Neubert describes an aqueous alkaline dispersion of (a) a rubbery vinyl pyridine copolymer latex, (b) a rubbery polybutadiene latex or a rubbery copolymer of at least 80% butadiene, and the balance a mono-ethylenically unsaturated monomer other than vinyl pyridine, e.g., maleic acid or maleic anhydride and (c) a water soluble, thermosetting phenolic-aldehyde resin for bonding glass fibers to rubber.

Another conventional treatment for polyester cord is taught in U.S. Pat. Nos. 5,654,099 and 5,807,634, wherein the polyester cord receives an initial polyphenylisocyanate treatment at 8 to 15 pounds of tension which is heat activated at a temperature in the range of 300° F. to 400° F. for 120 seconds to react the functional groups of the polyphenylisocyanate with the open bond sites in the cord. A RFL adhesive is coated over the reacted polyphenylisocyanate and dried, preferably in an oven, for 120 seconds at a temperature in the range of 180° F. to 275° F. to evaporate the water from the RFL and to keep the RFL from blistering prior to the heat setting of the cord. The heat setting of the polyester cord at 460° F. for 60 seconds takes place after the adhesive is applied and therefore, the adhesive is subjected to this elevated temperature. Adhesion between RFL treated textiles and EPDM rubbers can be achieved if the EPDM rubber is compounded in such a way as to allow for proper reaction chemistry (crosslinking) to occur at the interface of the rubber and the adhesive. Typically, these modifications to the EPDM rubber reduce the desired physical properties and dynamic flex life of the rubber compound. Accordingly, there is a need for an improved adhesive that is able to adhere textiles to an EPDM rubber that is compounded for extended belt life and temperature resistance.

SUMMARY OF THE INVENTION

The present invention relates to an adhesive composition containing which, when applied to a textile reinforcement in an environmentally safe manner, provides effective adhesion of the textile reinforcement to a rubber compound, and more particularly to EPDM rubber, and to a method for adhering such textiles to rubber compounds.

In accordance with the present invention, a rubbery latex such as hydrogenated styrene-butadiene rubber, carboxylated hydrogenated styrene-butadiene, hydrogenated nitrile-butadiene rubber, carboxylated hydrogenated nitrile-butadiene rubber, chlorosulfonated polyethylene or mixtures thereof is blended with an aqueous solution of a half-ester of maleinized liquid polybutadiene resin to form an improved adhesive for use in adhering textile reinforcing elements to EPDM rubber in the manufacture of rubber articles such as power transmission belts, etc. It is believed that the polybutadiene of the half-ester maleinized liquid polybutadiene resin provides a backbone on to which the half-ester maleic anhydride is grafted. These maleic anhydride functional groups are not conjugated, rather they form a syndiotactic grafted copolymer resin structure whereby the pendant half-ester maleic anhydride can crosslink to the rubber compound through peroxide or sulfur linkages.

The adhesive composition of the present invention provides adhesion to the EPDM rubber compound through crosslinking the latex portion of the adhesive composition to the EPDM rubber via either peroxide or sulfur linkages. In addition, adhesion is provided through crosslinking the maleic anhydride half-ester functional groups to the EPDM via the peroxide or sulfur linkages. This feature of the present adhesive composition provides improved bonding at the adhesive-EPDM rubber interface.

In one embodiment of the invention, an adhesive composition comprises (a) a latex of hydrogenated styrene-butadiene rubber (HSBR), carboxylated hydrogenated styrene-butadiene rubber (XHSBR), hydrogenated nitrile-butadiene rubber (HNBR), carboxylated hydrogenated nitrile-butadiene rubber (XHNBR), chlorosulfonated polyethylene (CSM), blended with (b) an aqueous solution of a half-ester of maleinized liquid polybutadiene resin. The adhesive composition may also utilize a combination of any of the lattices listed above, and may further contain latex blends with one or more of the following: styrene-butadiene rubber, nitrile, vinyl pyridine, natural rubber, acrylonitrile, ethylene-vinyl acetate (EVA), polyvinyl alcohol (PVOH), polyester such as ethylene-vinyl acetate copolymers, polyvinyl acetate, etc., polyurethane, polyvinyl chloride, polychloroprene, acrylic acid, methacrylic acid, vinylidine chloride, butyl, and copolymers and terpolymers thereof. It has been discovered that this combination of ingredients results in a composition that attains excellent adhesion of textiles to rubber compound formulations. The adhesive composition exhibits excellent hot durability and cold flex properties while maintaining the adhesive bond between the textile-rubber interface.

In another embodiment of the invention, a method for adhering reinforcing cord to rubber compounds comprises the steps of (a) dipping the cord into an adhesive composition comprising: (1) a latex of hydrogenated styrene-butadiene rubber, carboxylated hydrogenated styrene-butadiene rubber, hydrogenated nitrile-butadiene rubber, carboxylated hydrogenated nitrile-butadiene rubber, chlorosulfonated polyethylene, or blends thereof, and (2) an aqueous solution of a half-ester of maleinized liquid polybutadiene resin;

(b) drying the adhesive;

(c) incorporating a cord into the rubber compound; and (d) curing the cord and rubber compound.

The adhesive composition of the invention is particularly useful in the production of power transmission belts and more particularly for use in power transmission belts used in the automobile industry.

DETAILED DESCRIPTION OF THE INVENTION

In accordance with the present invention, there is provided an improved adhesive composition that will adhere ethylene-propylene-diene rubber to a reinforcing textile with excellent performance at both high and low temperatures. Traditionally, the adhesive system is applied to the reinforcing textile in a fluid carrier, either aqueous or solvent, dried, and heat set to achieve specific properties in the textile. The improved adhesion between the EPDM rubber and the reinforcing textile, in accordance with the invention, provides unexpected good results with respect to adhesion force between EPDM and the reinforcing fiber as well as improved rubber wear.

The adhesive composition of the present invention comprises: a latex such as hydrogenated styrene-butadiene rubber, carboxylated hydrogenated styrene-butadiene rubber, hydrogenated nitrile-butadiene rubber, carboxylated hydrogenated nitrile-butadiene rubber, chlorosulfonated polyethylene, and the like, blended with an aqueous solution of a half ester of a maleinized liquid polybutadiene resin. The adhesive composition may contain a combination of the above noted lattices and may also contain latex blends of one or more styrene-butadiene rubber, nitrile rubber, vinyl pyridine, natural rubber, acrylonitrile, polyester, e.g., ethylene-vinyl acetate copolymers, polyvinyl acetate, etc., polyvinyl chloride, polyurethane, polychloroprene, acrylic acid, methacrylic acid, vinylidine chloride, butylchloride, and copolymers, terpolymers and mixtures thereof. Preferably, the latex of the present invention is hydrogenated styrene-butadiene, carboxylated hydrogenated styrene-butadiene rubber, hydrogenated nitrile-butadiene rubber, carboxylated hydrogenated nitrile-butadiene rubber, or chlorosulfonated polyethylene, having a solids content of about 25 to 50%. Most preferably, the latex has a solids content of about 32 to 45%. The latex content of the adhesive is present in an amount which provides improved adhesive properties for adhering cord to EPDM rubber. Preferably, the latex is present in an amount of about 50 to 99% by weight and most preferably about 65 to 90% by weight.

The resin utilized in the present invention is typically an aqueous half-ester of maleinized polybutadiene and, more specifically, it is an ammonia neutralized isobutyl half-ester of maleinized liquid polybutadiene resin. Typically, the half-ester of maleinized liquid polybutadiene resin is prepared by reacting about 5 to 25 parts of maleic anhydride with 100 parts of liquid polybutadiene. The amount of maleinized liquid polybutadiene resin utilized in the adhesive composition of the present invention ranges from about 1 to 50%, preferably about 10 to 30% by weight. The concentration of the maleinized liquid polybutadiene resin in the aqueous solution as defined in the present invention is the concentration of the "half-ester" which typically is present in an amount of about 15 to 30% by weight and preferably about 19 to 25% by weight.

For the purpose of this invention, the half-ester of maleinized liquid polybutadiene is defined as an aqueous solution of a half-ester of maleinized liquid polybutadiene resin although it typically is not a true solution until after hydrolysis and neutralization to the half-ester, e.g., isobutyl half-ester. Water, preferably de-ionized water, is utilized in combination with the essential components of the present invention in order to provide an adhesive composition having a final solids content of about 5 to 40%, preferably about 15 to 30%.

The adhesive properties of the adhesive composition may be improved by the presence of carbon black. Generally, an aqueous dispersion of carbon black will be added in amounts up to about 15% by weight dispersion and, preferably in amounts of about 0.01 to 12% dispersion. Most preferably the aqueous dispersion of carbon black will be present in amounts of about 5 to 10% with amounts of 10% carbon black dispersion providing good results. While the solids content of the carbon black dispersion is not believed to be critical, the solids contents is typically about 30 to 50% and even more typically about 35 to 40% carbon black in water.

The latex of the present invention may be further blended with up to a major amount of one or more additional lattices of the following: styrene-butadiene rubber; nitrile rubber; butyl rubber; natural rubber; polyurethane; and polymers, copolymers and terpolymers of acrylonitrile, ethylene-vinyl acetate, vinyl alcohol, vinyl acetate, vinyl chloride, polychloroprene, acrylic acid, methacrylic acid, vinylidine chloride, and the like. Typically, up to about 75% by weight of these additional lattices based upon the total weight of the lattices can be employed. Preferably, the additional lattices may be added in amounts of about 0.01 to 75%. The additional lattices. Typically, the additional lattices are added as an aqueous dispersion in which the solids contents of the lattices in the dispersion is about 30 to 50% by weight.

After the adhesive is applied to the textile either by dipping, spraying or brushing, preferably by dipping, it is then dried in an oven at a temperature in the range of about 180° F. to 270° F., preferably about 225° F. to 250° F. for an effective time, typically, about 2 minutes. The textile is then heat set in an oven for about 1 to 3 minutes at a temperature in the range of from about 300° F. to about 450° F., preferably about 350° F. to 400° F. under a pull tension specific to textile type, denier, twist multiplier, and/or weave to attain specified tensile member properties. The adhesive composition of the present invention can optionally contain other well known additives including plasticizers, fillers, pigments, thickeners, dispersing agents, wetting agents, reinforcing agents and the like, in amounts employed by those skilled in the adhesive arts to obtain the desired consistency, appearance, reinforcing and uniformity of coating of the textile substrate.

The reinforcing textile of the present invention can be any of the various textiles conventionally employed in forming textile reinforced rubber products, particularly, power transmission belts. For example, exemplary textiles include polyamide fiber, meta- and para-aramide fiber; polyester fiber such as polyethylene terephthalate (PET), polyvinyl alcohol (PVA), and the like; polyethylene naphthalate (PEN) fiber; cotton fiber; glass fiber; carbon fiber; poly-p-phenylene-2,6-bezobisoxazole (PBO) fiber; acrylic fiber; rayon fiber; liquid crystal polymer (LCP) fiber; and the like. Preferably, the reinforcing textile is a polyester.

It is desirable that the adhesive-containing reinforcing textile be incorporated into the EPDM rubber compound as individual cords and then cured in a conventional manner employing one or more known peroxide or sulfur curing agents to produce rubber articles such as power transmission belts, more specifically poly-rib belts, synchronous belts, variable speed belts, flat belts, raw edge V-belts, and wrapped V-belts. The reinforcement element may also be in the form of an adhesive-containing fiber sheet between two or more layers of the EPDM rubber. In another aspect of the invention, the adhesive-containing fiber is chopped into short strands and dispersed throughout the rubber article. Any one or a combination of the above may be used to reinforce the rubber article.

As a result of low surface reactivity of the polyester, it may be desirable to pretreat the textile reinforcing element with a pre-dip composition in order to enhance the surface reactivity of the polyester cord. Such pretreatment is discussed in commonly assigned U.S. Pat. Nos. 5,654,009 and 5,807,634, the contents of which are incorporated herein by reference to the extent of the pretreatment.

For a more complete understanding of the invention, the following examples are presented to show specific uses of the techniques taught.

EXAMPLE 1

A mixture of 70 grams hydrogenated styrene-butadiene rubber latex (32% solids)[1], 10 grams carbon black dispersion (37.5% solids)[2], and 20 grams ammonia-neutralized aqueous solution of isobutyl half-ester of maleinized liquid polybutadiene resin (21.6% solids)[3], was diluted to a final solids content of 24% and coated onto an isocyanate pretreated polyester cord by dip application at 4% dip pick-up. The treated cord was dried in a 225° F. oven for 2 minutes and then heat set under 10 lbs. of tension at 400° F. for 1 minute. After heat setting, samples were prepared according to ASTM D1871; Method B, except that the cord was wound in closely space fashion against a first ply of EPDM rubber across the width of a mandrel. Samples of cord sandwich were then cut from the mandrel and tested according to Method B. Results were recorded as peak peel strength (measured in pounds per inch of width) and percent rubber retention at the rubber/treated cord interface. Results are shown in Table 1.

TABLE 1

| Test Condition | #Peels per ASTM D1871 Method B (lbs.) | % Rubber Retention (Estimated Percent Rubber Retention on 1 Inch Wide Sample) |
| --- | --- | --- |
| 72° F. Primary Adhesion | 73 | 100 |
| 250° F. Hot Box (30 min soak) | 24 | 100 |
| −40° F. Cold Box (30 min soak) | 81 | 100 |

EXAMPLE 2

Example 1 was repeated using 60 grams of the hydrogenated styrene-butadiene rubber, 10 grams of the carbon black dispersion, and 30 grams of the ammonia-neutralized aqueous solution of isobutyl half-ester of maleinized liquid polybutadiene resin. The results are shown in Table 2.

TABLE 2

| Test Condition | # Peels per ASTM D1871 method B (lbs.) | % Rubber Retention (Estimated Percent Rubber Retention on 1 Inch Wide Sample) |
| --- | --- | --- |
| 72° F. Primary Adhesion | 50 | 100 |
| 250° F. Hot Box (30 min soak) | 21 | 100 |
| −40° F. Cold Box (30 min soak) | 65 | 90 |

EXAMPLE 3

Example 1 was repeated using 70 grams of hydrogenated nitrile-butadiene rubber latex (45% solids)[4], 10 grams carbon black dispersion (37.5% solids), and 20 grams ammonia-neutralized aqueous solution of isobutyl half-ester of maleinized liquid polybutadiene resin (21.6% solids). The results are shown in Table 3.

TABLE 3

| Test Condition | # Peels per ASTM D1871 Method B (lbs) | % Rubber Retention (Estimated percent Rubber Retention on 1 Inch Wide Sample) |
| --- | --- | --- |
| 72° F. Primary Adhesion | 45 | 75 |
| 250° F. Hot Box (30 min soak) | 18 | 100 |
| −40° F. Cold Box (30 min soak) | 49 | 40 |

EXAMPLE 4

Example 1 was repeated using 70 grams carboxylated hydrogenated nitrile-butadiene rubber latex (40% solids)[5], 10 grams carbon black dispersion (37.5% solids), and 20 grams ammonia-neutralized aqueous solution of isobutyl half-ester of maleinized liquid polybutadiene resin (26.6% solids). The results are shown in Table 4.

TABLE 4

| Test Condition | # Peels Per ASTM D1871 Method B (lbs.) | % Rubber Retention (Estimated percent Rubber Retention on 1 Inch Wide Sample) |
| --- | --- | --- |
| 72° F. Primary Adhesion | 48 | 95 |
| 250° F. Hot Box (30 min soak) | 20 | 100 |
| −40° F. Cold box (30 min soak) | 48 | 50 |

EXAMPLE 5

Example 1 was repeated using 70 grams chlorosulfonated polyethylene (40% solids)[6], 10 grams carbon black dispersion (37.5% solids), and 20 grams ammonia-neutralized aqueous solution of isobutyl half-ester of maleinized liquid polybutadiene resin (21.6% solids). The results are shown in Table 5.

TABLE 5

| Test Condition | # Peels Per ASTM D1871 Method B (lbs.) | % Rubber Retention (Estimated percent Rubber Retention on 1 Inch Wide Sample) |
| --- | --- | --- |
| 72° F. Primary Adhesion | 36 | 40 |
| 250° F. Hot Box (30 min soak) | 16 | 90 |
| −40° F. Cold box (30 min soak) | 31 | 20 |

[1] Goodyear Chemical HSBR Latex
[2] Solution Dispersion Ajax Black 36
[3] Revertex Lithene n4-5000
[4] Sumitomo Seika HNBR Latex
[5] Zeon Chemicals Zetpol B Latex
[6] Sumitomo Seika CSM 450 Latex Having described the invention in detail and by reference to the preferred embodiments thereof, it will be apparent that modifications and variations are possible without departing from the scope of the invention defined in the appended claims.

What is claimed is:

1. An adhesive composition having improved adhesion characteristics for use in bonding a textile reinforcing element to rubber, said adhesive composition comprising:

a latex of at least one of a hydrogenated styrene-butadiene rubber, a carboxylated hydrogenated styrene-butadiene rubber, a hydrogenated nitrile-butadiene rubber, a carboxylated hydrogenated nitrile-butadiene rubber and a chlorosulfonated polyethylene; and an aqueous solution of an isobutyl half-ester of maleinized liquid polybutadiene resin, with the proviso that said adhesive composition does not contain resorcinol-formaldehyde resin.

2. The adhesive composition of claim 1 wherein said composition comprises about 50 to 99% by weight of said latex having a solids content of about 25 to 50%.

3. The adhesive composition of claim 2 wherein said composition comprises about 65 to 90% by weight of said latex.

4. The adhesive composition of claim 2 wherein said latex has a solids content of about 32 to 45%.

5. The adhesive composition of claim 1 wherein said aqueous solution comprises about 1 to 50% by weight said isobutyl half-ester of maleinized liquid polybutadiene resin.

6. The adhesive composition of claim 3 wherein said aqueous solution contains about 10 to 35% by weight said isobutyl half-ester of maleinized liquid polybutadiene resin.

7. The adhesive composition of claim 1 wherein said aqueous solution of isobutyl half-ester of maleinized liquid polybutadiene resin is neutralized.

8. The adhesive composition of claim 7 wherein said aqueous solution of isobutyl half-ester of maleinized liquid polybutadiene resin is neutralized with ammonia.

9. The adhesive composition of claim 1 wherein the concentration of said half-ester of maleinized liquid polybutadiene resin in said solution is about 15 to 30% by weight.

10. The adhesive composition of claim 9 wherein the concentration of said half-ester of maleinized liquid polybutadiene resin in said solution is about 19 to 25% by weight.

11. The adhesive composition of claim 1 wherein said composition further comprises and aqueous dispersion containing carbon black.

12. The adhesive composition of claim 11 wherein said aqueous dispersion contains up to about 15% carbon black, said dispersion having a solids content of about 30 to 50%.

13. The adhesive composition of claim 12 wherein said aqueous dispersion contains about 0.01 to 12% carbon black.

14. The adhesive composition of claim 12 wherein said aqueous dispersion contains about 8 to 10% carbon black.

15. The adhesive composition of claim 1 wherein said latex is further blended with a second latex containing one of styrene-butadiene rubber, nitrile rubber butyl rubber, natural rubber, polyurethane, polychloroprene, and polymers, copolymers and terpolymers of acrylonitrile, ethylene-vinyl acetate, vinyl alcohol, vinyl acetate, vinyl chloride, acrylic acid, methacrylic acid and vinylidine chloride.

16. The adhesive composition of claim 15 wherein said latex contains up to about 75% of said second latex, said second latex having a solids content of about 30 to 50%.

17. The adhesive coniposition of claim 16 wherein said latex contains about 0.01 to 75% of said second latex.

18. The adhesive composition of claim 1 wherein said textile reinforcing element is selected from the group consisting of polyamide fiber, met and para-amid fiber, polyester fiber, polyethylene terephthalate fiber, polyethylene naphthalate fiber, cotton fiber, carbon fiber, glass fiber, poly (p-phenylene-2,6-benzobisoxazole) fiber, acrylic fiber, rayon fiber, and liquid polymer fiber.

19. The adhesive composition of claim 18 wherein said textile reinforcing element is polyester fiber.

20. The adhesive composition of claim 1 wherein said rubber is ethylene-propylene-diene rubber.

* * * * *